UNITED STATES PATENT OFFICE.

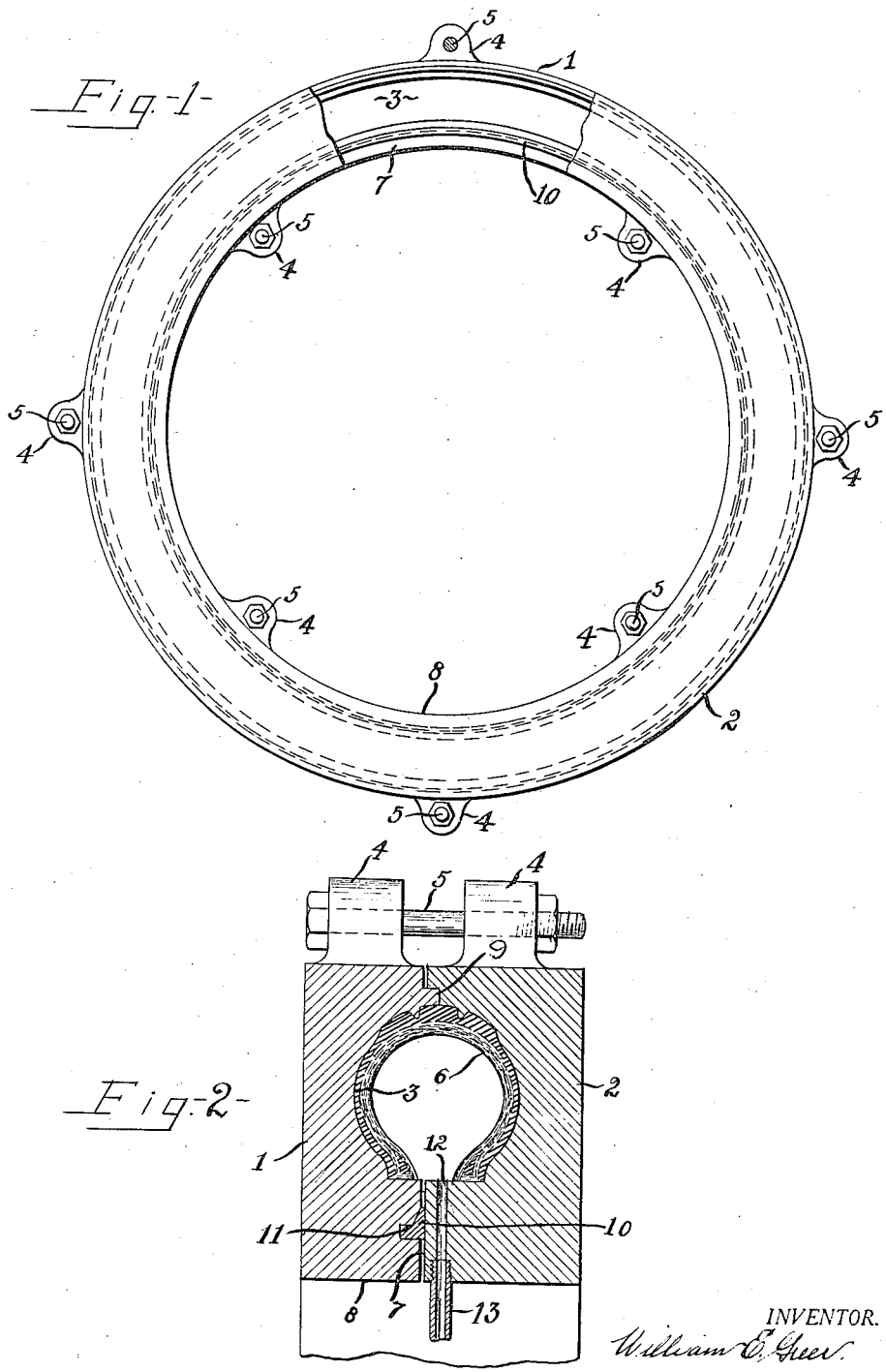

WILLIAM E. GREER, OF SYRACUSE, NEW YORK.

TIRE-MOLD.

1,394,547.   Specification of Letters Patent.   Patented Oct. 25, 1921.

Application filed February 7, 1920. Serial No. 357,067.

*To all whom it may concern:*

Be it known that I, WILLIAM E. GREER, a citizen of the United States, and a resident of Syracuse, in the county of Onondaga and State of New York, have invented a certain new and useful Tire-Mold, of which the following is a specification.

This invention relates to apparatus for molding tires, particularly molds in which internal pressure is used instead of solid cores, and it has for its object a particularly simple and efficient mold apparatus in which the pressure of the medium under pressure, as air, is applied directly to the inner face of the rough casing in the mold and in which the escape of the fluid under pressure from the mold is prevented without the use of a bag or tube.

This invention consists in the novel features and in the combinations and constructions hereinafter set forth and claimed.

In describing this invention, reference is had to the accompanying drawings in which like characters designate corresponding parts in the views.

Figure 1 is an elevation partly broken away of a tire mold embodying my invention.

Fig. 2 is an enlarged sectional view on line 2—2, Fig. 1.

Heretofore, in molding tires, especially cord tires, internal air pressure has been applied to the rough casing to be molded, the air under pressure being confined in a tube similar to the inner tube of a tire. By my invention, this tube is dispensed with and air or other fluid under pressure applied directly to the rough casing.

1 and 2 designate the opposing circular sections of a mold which confine between them a cavity 3, these sections 1, 2 being clamped together in any suitable manner, they being here shown as provided with radially extending lugs 4 at their inner and outer sides through which clamping screws or bolts 5 are passed.

6 designates a rough casing to be molded, the beads of which are spaced apart as shown and located on opposite sides of the crevice 3 or line of separation between the sections 1, 2 so that the casing does not seal the mold cavity where the sections 1, 2 come together at the inner side of the mold cavity 3, that is between the cavity and the inner circumferential face 8 of the mold.

The outer side of the cavity at the line of separation 9 between the mold sections is sealed by the rubber of the tread of the casing as this rubber will run into the crevice along this line of separation especially when the mold is heated. However, on the inner side of the cavity, that is, the side at 8, there is nothing to prevent the air, used to apply internal pressure directly to the shoe or casing, from escaping through the crevice 7.

Heretofore, as before mentioned, the escape of air at this point has been prevented by the use of a tube similar to an inner tube of a tire. I dispense with this inner tube and the trouble incidental to the use thereof, by closing the crevice 7 by suitable means as a gasket 10 located between the opposing faces of the sections 1, 2 on the inner side of the mold cavity, that is, between the mold cavity and the inner circumferential face of the mold.

The gasket 10 may be made in any suitable form, size and construction and either compressed between the opposing surfaces of the mold sections or arranged in grooves provided for that purpose as the groove 11.

One of the sections as 2 is provided with the passage 12 extending at one side of the gasket 10 by means of which the air or other fluid under pressure is supplied to the mold cavity, this passage being connected by a pipe 13 to a suitable source of supply not shown.

What I claim is:

1. A tire mold comprising opposing sections confining a mold cavity for receiving a rough tire casing, one of the sections being formed with means for conducting a fluid under pressure to the mold cavity directly in contact with the inner face of the casing to exert an internal pressure on the casing in the mold cavity, and means located outside of the mold cavity for preventing the escape of such fluid from the mold cavity, substantially as and for the purpose described.

2. A tire mold comprising opposing sections confining a mold cavity for receiving a rough tire casing, one of the sections being formed with means for conducting a fluid under pressure to the mold cavity directly in contact with the inner face of the casing to exert an internal pressure on the casing in the mold cavity, means located outside of the cavity and between the sections on the side of the cavity toward the center of the mold for preventing the escape of such fluid, substantially as and for the purpose specified.

3. A tire mold compressing opposing sections confining a mold cavity for receiving a rough tire casing, one of the sections being formed with means for conducting a fluid under pressure to the mold cavity directly in contact with the inner face of the casing to exert an internal pressure on the tire in the mold cavity, and a gasket between the sections, the gasket being located outside of the mold cavity, substantially as and for the purpose set forth.

In testimony whereof, I have hereunto signed my name, at Syracuse, in the county of Onondaga, and State of New York, this 7th day of January, 1920.

WILLIAM E. GREER.